(12) United States Patent
Thiessen

(10) Patent No.: US 7,325,777 B2
(45) Date of Patent: Feb. 5, 2008

(54) PORTABLE ARTICULATING TOOL SUPPORT

(76) Inventor: Gordon Daniel Thiessen, 21226 95A Avenue, Langley, British Columbia (CA) V1M 1P2

( * ) Notice: Subject to any disclaimer, the term of this patent is extended or adjusted under 35 U.S.C. 154(b) by 178 days.

(21) Appl. No.: 11/060,612

(22) Filed: Feb. 18, 2005

(65) Prior Publication Data

US 2006/0186281 A1  Aug. 24, 2006

(51) Int. Cl.
*E04G 3/00* (2006.01)
(52) U.S. Cl. .................................. 248/278.1; 81/57.4
(58) Field of Classification Search ........... 248/123.11, 248/278.1, 276.1, 280.11; 81/57.4; 16/366
See application file for complete search history.

(56) References Cited

U.S. PATENT DOCUMENTS

| | | | | |
|---|---|---|---|---|
| 3,333,613 | A | * | 8/1967 | Bosse .......................... 81/57.4 |
| 3,694,888 | A | * | 10/1972 | Bosse .......................... 29/240 |
| 3,917,200 | A | * | 11/1975 | Johnson ...................... 248/647 |
| 4,610,560 | A | * | 9/1986 | Miller ......................... 403/119 |
| 5,109,736 | A | * | 5/1992 | Dixon ......................... 81/57.4 |
| 5,544,554 | A | * | 8/1996 | Brightly ..................... 81/57.4 |
| 6,711,972 | B1 | * | 3/2004 | Joyner et al. ................ 81/57.4 |
| 7,055,789 | B2 | * | 6/2006 | Libbey et al. ............ 248/278.1 |
| 2004/0026584 | A1 | | 2/2004 | Libbey et al. ............ 248/278.1 |
| 2005/0023015 | A1 | | 2/2005 | Argento ........................ 173/36 |

FOREIGN PATENT DOCUMENTS

| | | |
|---|---|---|
| EP | 0 192 253 | 8/1986 |
| EP | 0 429 008 | 5/1991 |
| EP | 1 312 251 | 5/2003 |
| WO | WO 00/16950 | 3/2000 |

* cited by examiner

*Primary Examiner*—Carl D. Friedman
*Assistant Examiner*—Todd M. Epps
(74) *Attorney, Agent, or Firm*—Fasken Martincau DuMoulin LLP

(57) ABSTRACT

A portable multiple-component articulating support apparatus for engaging, moving, orientating and manipulating a hand-operated power tool within and throughout a three-dimensional workspace. The apparatus includes a clamping device for demountable engagement with a structural element, an elongate double-link hinge member, a spacer arm having opposite ends adapted for detachable engagement and rotational communication with the clamping device and the double-link hinge member, a vertically disposed pivotably connected counterbalance arm assembly adapted for detachable engagement and rotational communication with the double-link hinge member. The counterbalance arm assembly is equipped with a gas-charged cylinder for balancing the weight of hand-operated power tools. The clamping device, spacer arm, double-link hinge and counterbalance arm assembly are interconnected with removable hinge pins. A tool-mounting bracket is provided for grippingly engaging a power tool. The tool-mounting bracket pivotably engages a power tool-bearing member which slidingly and rotatably communicates with the counterbalance arm assembly.

14 Claims, 9 Drawing Sheets

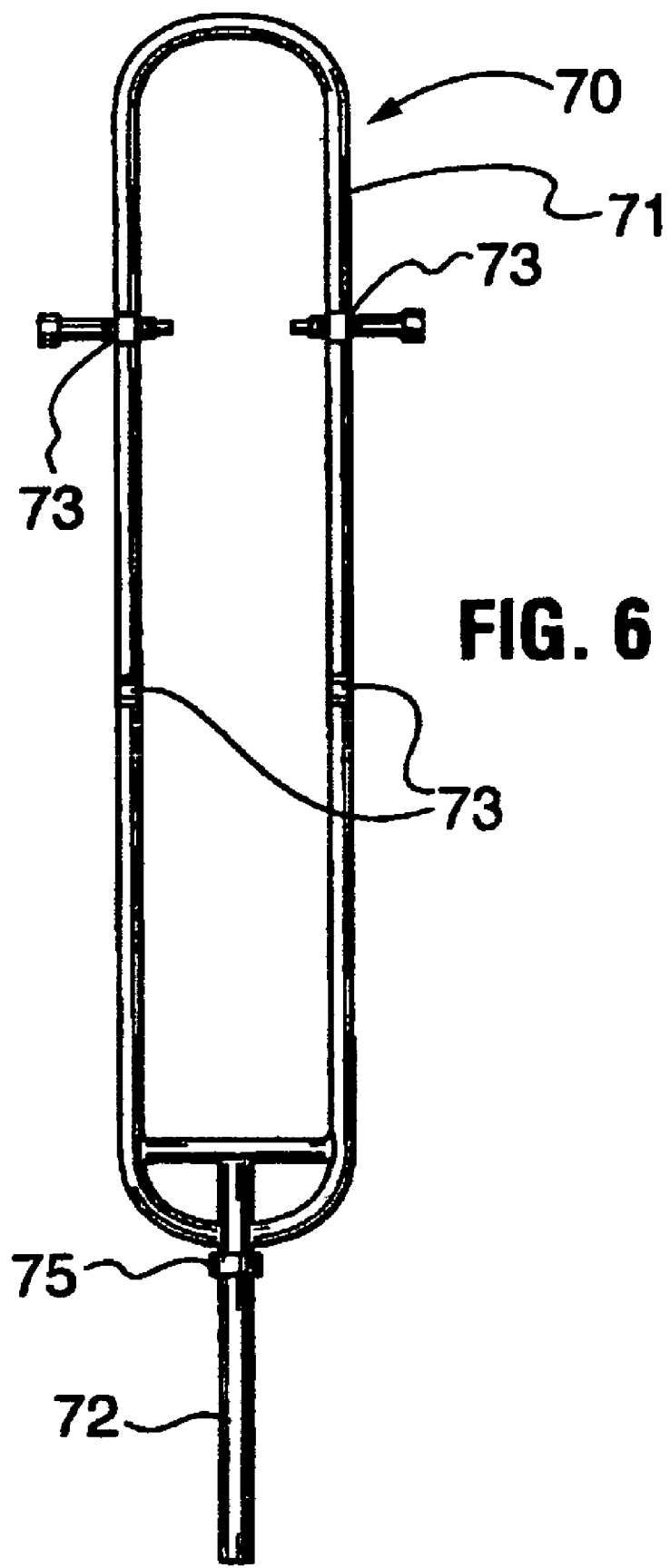

PORTABLE ARTICULATING TOOL SUPPORT

FIELD OF THE INVENTION

The present invention relates to articulating supports for hand power tools, and more particularly, to portable articulating supports for manual-controlled movement and operation of hand power tools within and throughout three-dimensional work spaces.

BACKGROUND OF THE INVENTION

Electric and pneumatic-powered hand power tools such as jacks, hammer drills, air hammer, impact wrenches and reciprocating saws among others, are commonly used in construction and demolition industries, in heavy equipment repair, and in under-ground mining activities. The weights of these types of tools range between 4.5 kg (i.e., 10 lbs) to 22.7 kg (i.e., 50 lbs) and in some cases, e.g., jackhammers, may each 34 kg (i.e., 75 lbs) or more. Such tools typically generate considerable torque and vibratory forces which are transmitted to the operators' hands, arms and bodies making precise manipulation of die tools difficult. Quite often, it is necessary for operators to wield, manipulate, orientate and operate ties tools in three-dimensional work spaces that include multiple outward and upward-directed planes, while the tools are being held at elevations ranging from the waistline to above the shoulders. Extended operation of such tools in these positions may cause muscle fatigue and/or numbness in the operators' bands and arms hereby acting not only operator efficiency, but also their safe handling of the tools. Furthermore, the nature of uses to which such tools are applied often result in the tools being inadvertently jammed, stuck or deflected thereby causing unexpected transmission of torque forces that may cause operators to lose their balance resulting in twisting of their bodies or falls causing injuries.

Multi-component articulating supports for enabling the engagement and manipulation of tools in three-dimensional work spaces are known. Examples include those disclosed in U.S. patent application publication US 2004/0026584 to Libbey et al., published on Feb. 12, 2004; PCT application WO 00/16950 to Casun AB Bygg Och Industriservis, published on Mar. 30, 2000; and European Patent Application 0 192 253 A1 to Construction Robotics, Inc. published on Aug. 27, 1986.

The proximal ends of these types of supports are typically securely and permanently fastened to structural members or platforms that are components of the work spaces or alternatively, awe mounted to transportable platforms, e.g., truck beds or trailers. The distal ends of these supports are provided with tool-engaging devices that securely clamp onto power tools. The tool-engaging devices may be permanently positioned in pre-set orientations, or alternatively, may provide limited movement of the tools in one plane, e.g., a vertical arc or a horizontal arc. Typically, theses types of tool supports are comprised of pluralities of members that are pivotably connected to: (a) each other, (b) to structural elements at the proximal ends of the supports, and (c) to tool-engaging devices at the distal ends of the supports. Most commonly, the first member adjacent the distal end of the support is an articulated arm adapted to move in a vertical plane, and is equipped with a weight-balancing and/or positional control means for a power tool clamped to its distal end. The first member is pivotably connected to a second member whereby the first member can swing in a horizontal arc around its connection point to the second member. The second member is usually pivotably connected to a structural element at the proximal end of the support whereby the second member can swig in limited horizontal arc around its connection point to the structural element. Some articulated supports provide one or more additional members inserted between the first and second member, with each member pivotably connected to its adjacent members thereby enabling each member to swing in a limited horizontal arc around its connection points. Positioning of the tools within three-dimensional workspaces is accomplished by concurrent (a) lateral movements of the members through horizon arcs around their connection points, and (b) vertical movements of the first members adjacent the distal end of the supports.

The known multi-component articulating supports are typically permanently assembled by means of secured pivot shaft connecting adjacent members, most commonly through clevis-type brackets that are integral to the member bodies. The width of the member bodies restricts the horizontal arc movement of adjacent members, i.e., to about 270° or less, so that adjacent members cannot be completely folded against each other. The rugged nature of the tool-engaging devices and their connection to the first members provide only limited operator-controlled positioning and manipulation of hand power tools relative to the first members. Consequently, such supports arm not suitable for use in three-dimensional workspaces where space is restricted or limited and where the tools must be manipulated in multiple radial outward and upward orientations relative to the first member. Another disadvantage is that, due to the permanent assembly of the parts, they can not be easily modified to extend or reduce their scope of movement through disassembly and the addition or removal of one or more members. Furthermore, due to the secure fastenings required to attach the distal ends of the supports to structural members in order to provide stability to the supports when in use, they are not portable, i.e., quickly and easily dismounted form the structural member for transport.

There is a need therefore, to improve the adaptability and maneuverability of multiple-component articulating supports for hand power tools within and throughout restricted three-dimensional workspaces and the portability of such support between jobsites.

SUMMARY OF THE INVENTION

It is an object of the present invention, at least in preferred forms, to provide a portable articulating support for improving ease-of-use of hand-operated power tools within and throughout three-dimensional work spaces, and which can be quickly assembled for use, then disassembled for storage or transport.

According to one aspect of the present invention, there is provided a portable articulating support apparatus for supporting a hand-manipulated power tool while allowing movement of the tool in three dimensions, the apparatus comprising: a mounting device for the apparatus capable of disengageable attachment to a support element, one or more hinge members each having two spaced, parallel bores for receiving hinge pins therein; a tool holder capable of engaging and supporting a hand-operated power tool while allowing swivelling of said tool about horizontal and vertical axes; one or more spacer elements; a counterbalance element having opposite ends, with one end detachably engaged with one said hinge member and an opposite end engaged with the tool holder, said opposite end being movable in a vertical plane while said one end is supported by said one hinge member, and having a balancing arrangement generating a force counteracting weight applied to said one end by said tool holder. A portable articulating support apparatus for supporting a hand-manipulated power tool while allowing movement of the tool in three dimensions, the apparatus condensing: a mounting device for the apparatus capable of disengageable attachment to a support element; one or more hinge members each having two spaced, parallel bores for receiving hinge pins therein; a tool holder capable of engaging and supporting a hand-operated power tool while allowing swivelling of said tool about horizontal and vertical axes; one or more spacer elements; a counterbalance element having opposite ends, with one end detachably engaged with one said hinge member and an opposite end engaged with the tool holder, said opposite end being movable in a vertical plane while said one end is supported by said one hinge member, and having a balancing arrangement generating a force counteracting weight applied to said one end by said tool holder, wherein said mounting device, said one or more spacer elements, said one or more hinge members and said counterbalance element are arranged to form inter parts of an articulating arm having said mounting device at one end of the articulating arm, said counterbalance element at an opposite end of the articulating arm, and said one or more spacer elements and said one or more hinge members alternating therebetween; and a plurality of vertically disposed hinge pins passing trough vertically aligned bores, including said spaced, parallel bores of said one or more hinge member, in said interconnecting parts of said articulating arm to allow pivotal rotation of said parts around said hinge pins, at least one of said hinge pins being slidably removable from one said bores and having an enlarged head at an upper end thereof shaped to be graspable by hand to facilitate complete removal of said pin, thereby allowing at least partial disassembly of said articulating arm for ease of transportation of said apparatus.

According to another aspect of the invention, there is provided portable articulating support apparatus for supporting a hand-operated power tool while allowing movement of the tool in three dimensions, the apparatus comprising: a mounting device capable of disengageable attachment to a support element; a hinge member having two juxtaposed bores for receiving hinge pins therethrough; a tool holder capable of engaging and supporting a hand-operated power tool while allowing swivelling of said tool about lace and vertical axes, a spacer arm having opposite ends with one end detachably engaged with the mounting device, and another end detachably engaged with the hinge member; and a counterbalance arm having opposite ends, with one end detachably engaged with the hinge member and an opposite end detachably engaged with the tool holder, said opposite end being movable in a vertical plane while said one end is supported by said hinge element, and having a balancing arrangement generating a force counteracting weight applied to said one end by said tool holder; wherein said mounting device, spacer arm, hinge member and counterbalance arm are detachably and rotatably engaged one with another by a plurality of removable vertically disposed hinge pins passing through vertically aligned bores in overlapping parts of said mounting device, spacer arm, hinge member and counterbalance arm, said removable hinge pins having enlarged heads at upper ends thereof shaped to be graspable by hand to facilitate complete removal of the pins from said bores, thereby allowing separation of said mounting device, spacer arm, hinge member and counterbalance arm for ease of replacement, storage and transport thereof.

According to yet another aspect of the invention, there is provided a tool holder for supporting a power tool from an articulating arm while allowing movement of the tool in three dimensions, the holder comprising: a tool-mounting bracket equipped with a tool-clamping device; a bracket support connected to said tool-mounting bracket while allowing the bracket to swivel around a horizontal axis; and a load-bearing shaft interconnected with the bracket support, said shaft being capable of attachment to a movable sport while permitting swivelling of said tool holder about a vertical axis.

In a preferred form, the invention provides a multiple-component articulating tool support wherein the components are detachably engaged with removable hinge pins. The tool support has a proximal end and a distal end wherein a clamping device is provided at the proximal end for demountably engaging a structural support element, and a vertically disposed counterbalance arm assembly is provided at the distal end for slidingly receiving and supporting therein a tool-bearing member. The counterbalance arm assembly is preferably provided with a gas-charged cylinder for balancing and supporting the weight of a hand-operated power tool and is confirmed to pivotably move in a vertical axis. There is also provided a double-link hinge component configured to receive therethrough two opposing removable hinge pins for detachably engaging the counterbalance arm assembly and one or more spacer arms intermediate the clamping device. The spacer arm can be detachably engaged with the clamping device or alternatively, the spacer arm can be detachably engaged to a double-link hinge which is also detachably engaged with the clamping device. The components of this invention can easily be moved rotatably around the removable hinge pins by which they are detachably engaged so that the components can be folded tightly together, tally folded, or unfolded so that the combination of components form a straight line. A hand-operated power tool mounted in the tool bearing member can easily be moved, orientated, manipulated, and operated within and throughout a three-dimensional workspace with minimal physical exertion.

In another preferred form, the invention provides a tool-mounting bracket for communicating with the tool-bearing member wherein the tool-mounting bracket comprises two opposing plates integrally conjoined by a bottom plate. The bottom plate is provided with a bore for a clamping device to grippingly engage a hand-operated power tool therethrough. The opposing plates are provided with one or more pairs of aligned bores for receiving therein connecting devices for pivotably communicating with the tool-bearing member.

In another preferred form, the invention provides a tool-bearing member in the form of an elongate continuous loop provided with one or more pairs of aligned opposing sleeves for receiving therein connecting devices for pivotably communicating with the tool mounting bracket. The elongate continuous loop is integrally connected at one end to a load-bearing shaft for slidingly and rotatably communicating with the counterbalance arm assembly. A stop collar is provided for demountable engagement with the load-bearing shaft. The tool-bearing member can be inserted into the counterbalance arm assembly from above whereby the stop collar rotatably communicates with the arm assembly. Alternatively, the tool-bearing member can be inserted into the counterbalance arm assembly from below whereby the stop collar is engaged with the portion of load-bearing shaft protruding from the top of the counterbalance arm assembly, thereby suspending the tool-bearing member below the counterbalance arm assembly.

In another preferred form, the invention provides a tool-bearing member in the form of a rod assembly comprised of a load-bearing shaft connected at one end to a universal joint. The universal joint is also connected to a tool-bearing shaft having a threaded bore in its free end for grippingly engaging therein the clamping device of the tool-mounting bracket the load-bearing shaft is inserted into the counterbalance arm assembly from below whereby the stop collar is engaged with the portion of load-bearing shaft protruding from the top of the counterbalance arm assembly, thereby suspending the tool-bearing member below the counterbalance arm assembly.

In still another preferred form, the invention provides a plurality of devices for retaining power cords adjacent the counterbalance arm assembly and the spacer arms.

BRIEF DESCRIPTION OF THE DRAWINGS

The present invention will be described in conjunction with reference to the following drawings in which:

FIG. 6 is a view of another component of the portable articulating tool support of the present invention;

DETAILED DESCRIPTION OF THE INVENTION

Figure 1:
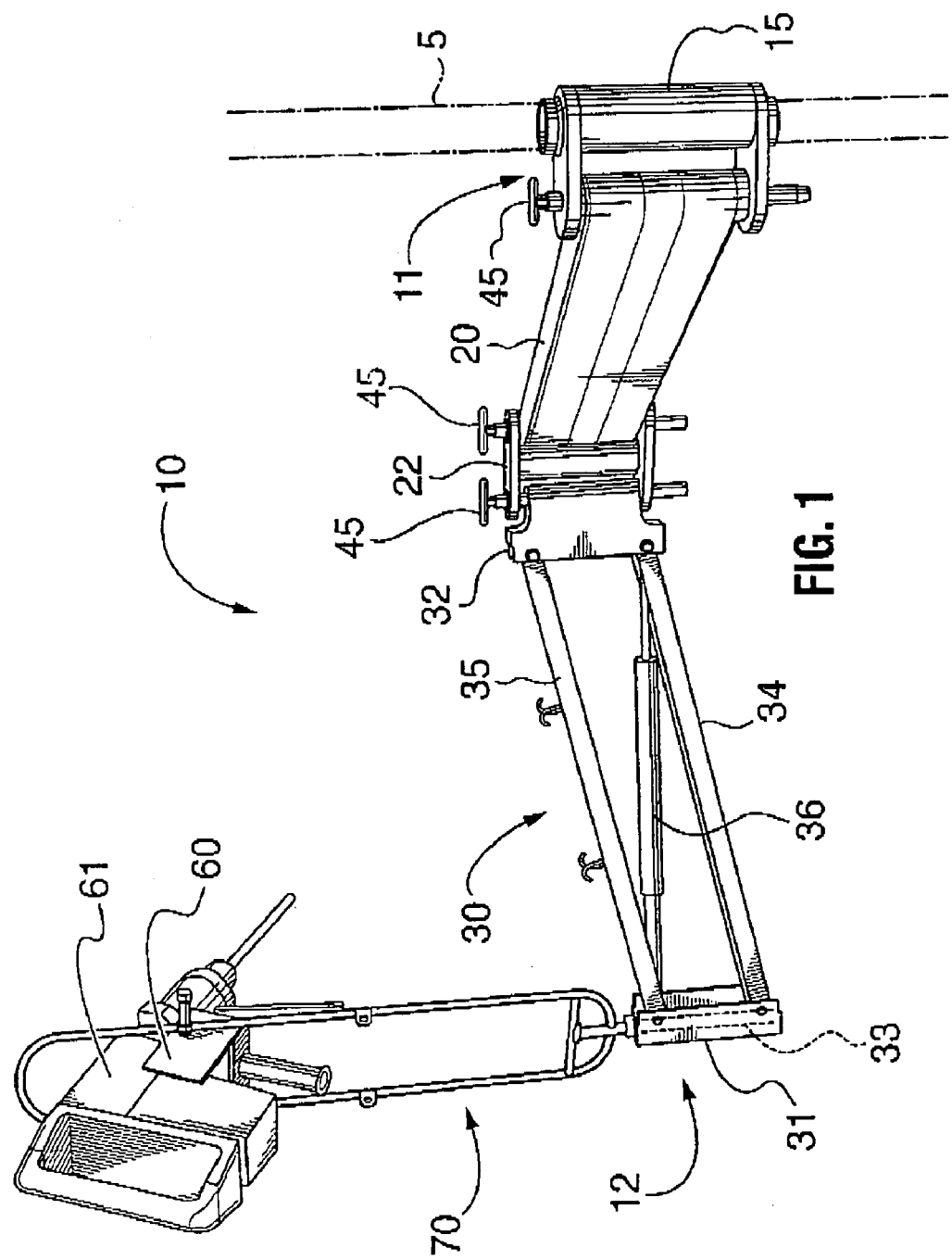
FIG. 1 is a perspective view of one embodiment of the portable articulating tool support of the present invention.

As shown in FIG. 1 of the accompanying drawings, a preferred embodiment of the present invention comprises a portable, multi-component articulating support apparatus 10 for a hand-manipulated power tool 61, e.g. a rock dill as shown. The support 10 has a proximal end 11 and a distal end 12, and is equip with a mounting device 15 for detachable engagement with a support element 5 at proximal end 11. Mounting device 15 is detachably coupled to the proximal end of an elongated rigid spacer element 20 by means of a hinge pin 45, while the distal end of spacer element 20 is detachably coupled to one side of double-axis hinge element 22 by means of another hinge pin 45. The distal end 12 of support apparatus 10 includes an articulating elongated counterbalance element 30 detachably coupled to the other side of the double-axis hinge element 22 by means of another hinge pin 45. Articulating counterbalance element 30 has a distal bracket 31 and a proximal bracket 32, both pivotably connected to a lower control rod 34 and an upper control rod 35 whereby distal bracket 31, proximal bracket 32, lower control rod 34 and upper control rod 35 form a freely articulating parallelogram. Located diagonally within the articulating parallelogram is a balancing arrangement 36 in the form of a gas-charged cylinder interconnected between proximal bracket 31 and distal bracket 32 using the same rotatable attachment points as the respective ends of control rods 34 and 35. Distal bracket 31 is provided with shaft receptacle 33 in the form of a longitudinal bore coincident with its longitudinal axis for slidingly and rotatably receiving a load-bearing shaft 72 (see FIG. 6) which is integrally connected to a tool holder 70 which includes a tool-mounting bracket 60 and a bracket support 71 in the form of a continuous stiff wire loop as shown. Hand-manipulated power tool 61 is securely held within the tool-mounting bracket 60 which, in turn, is pivotably held within bracket support 70. The balancing arrangement 36 in the form of the gas-charged cylinder provides weight-balancing support for power tool 61 enabling the tool to be suspended hands-free at an elevation at which the force generated by the cylinder balances the weight of the tool and tool holder. The distal end of the counterbalance element 30 is movable in a vertical plane by virtue of the articulation of rods 34 and 35 while the proximal end remains at the height of hinge member 22. The operator can therefore raise or lower the tool and tool holder from the position of counterbalance by applying minimal fore without having to support the full weight of the tool.

The tool holder 70 also allows the tool 60 to be swivelled about a horizontal axis at the point where the bracket 60 is mounted within the bracket support 71, and about a vertical axis when the load-bearing shaft 72 fits within shaft receptacle 33.

Figure 2:
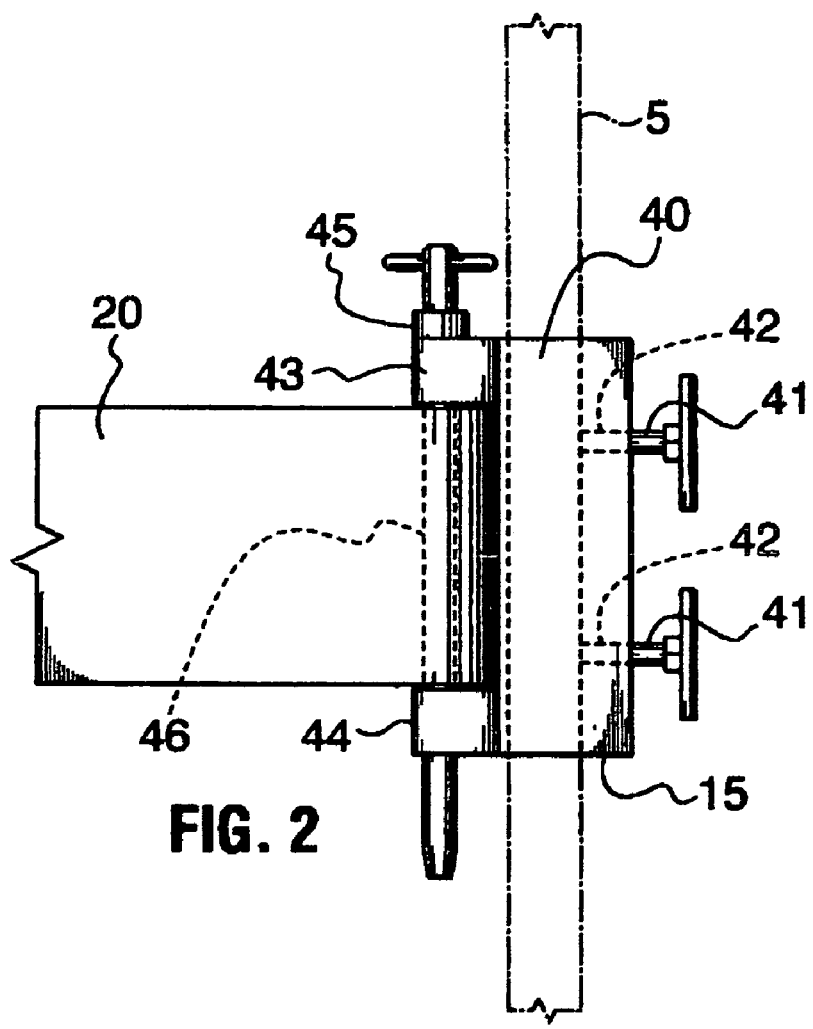
FIG. 2 is a partial view of the proximal end of the embodiment shown in FIG. 1.

As shown more clearly in FIG. 2, mounting device 15 is provided with a sleeve 40 sized to slip over and slide along a support element 5, e.g. a scaffold bar or an upright bar supported on a movable base member (not shown). Mounting device 15 is provided with hand operable tightening devices for rigidly connecting sleeve 40 with support element 5. In this preferred embodiment for example, threaded bolts 41 are screwed into and through threaded bores 42 in the sleeve 40 to bear against the structural element 5. The position of mounting device 15 along the vertical axis of support element 5 can be quickly and easily changed by loosening the threaded bolts 42, thereby disengaging structural element 5 from sleeve 40, moving mounting device 15 to a different selected position (i.e. height), and then re-engaging support element 5 by re-tightening bolts 41. It should be noted that other devices can be provided for engaging mounting device 15 with support element 5. For example, threaded bolts 42 may be replaced by spring loaded pins slidingly communicating with unthreaded bores for releasably engaging support element 5, or alternatively, clamping devices may be provided for engaging the wall of sleeve 40 with support element 5. It should also be noted that sleeve 40 can be shaped to slidingly communicate with solid or tubular structural elements having circular cross-sections, or alternatively, square, rectangular or other cross-sections. Mounting device 15 is also provided with upper and lower outwardly projecting brackets 43 and 44, respectively, both having bores aligned along a common a vertical axis for receiving graspable removable hinge pin 45 therein. Proximal end of a spacer element 20 fits within a gap formed between brackets 43 and 44 to form overlapping parts. The proximal end of the spacer element is support by the upper of lower bracket 44, and is provided with bore 46 for receiving hinge pin 45 therethrough. Thus, the proximal end of spacer element 20 is detachably coupled to mounting device 15 by means of removable hinge pin 45 passing through the bore on upper bracket 43, through bore 46 at the proximal end of spacer arm 20, and then through the bore on lower bracket 44 thereby enabling spacer am 20 to rotate in a horizontal arc around the non-rotatable mounting device 15.

Figure 3:
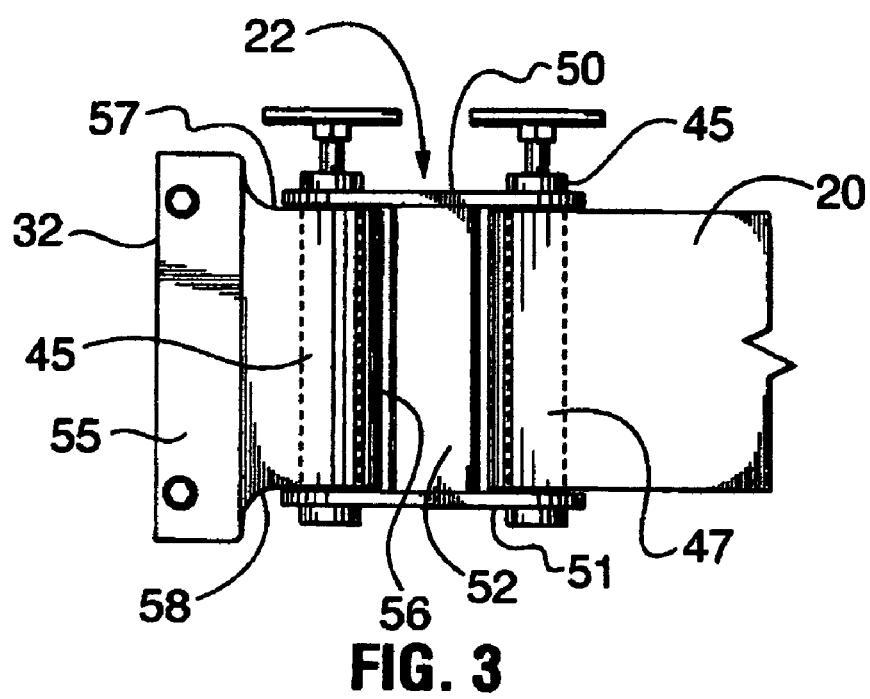
FIG. 3 is a partial view of the distal en of the embodiment shown in FIG. 1.
Figure 4:
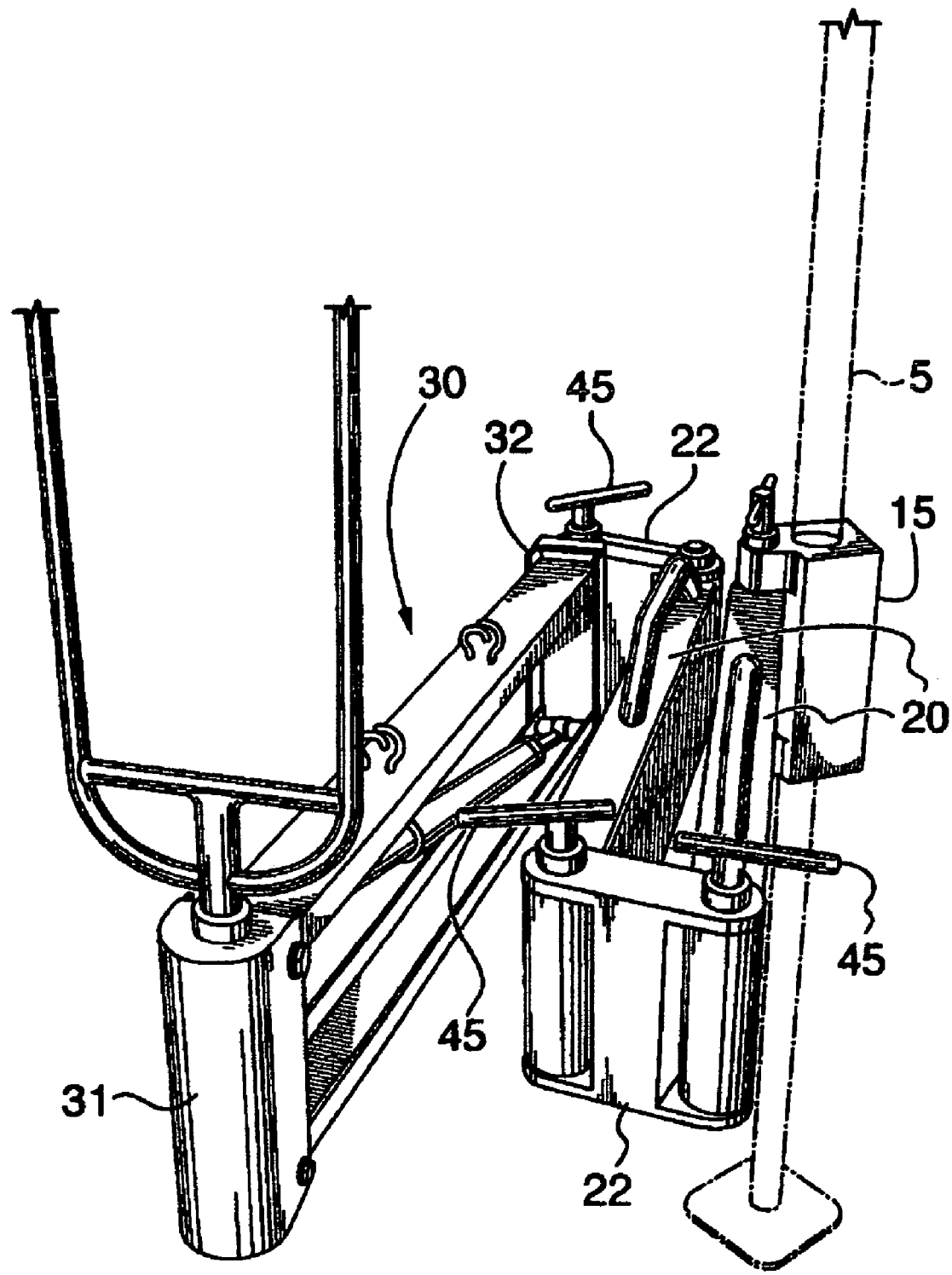
FIG. 4 is a perspective view of another embodiment of the portable articulating tool support of the present invention.

As shown more clearly in FIG. 3, double-axis elongated hinge element 22 has an upper hinge bracket 50 and lower hinge bracket 51 integrally connected by a vertical web 52. Upper hinge bracket 50 is provided with bores on either side of vertical web 52, the bores being aligned with opposing bores provided on lower hinge bracket 51 whereby each set of upper and lower bores is adapted to receive hinge pin 45 therethrough. The distal end of spacer element 20 fits snugly between the upper upper and lower hinge brackets to form overlapping parts, and is supported by an upper surface of the lower hinge bracket 51. The distal end is provided with a bore 47 for receiving a hinge pin 45 therethrough. The distal end of space arm 20 is thus detachably coupled at respective overlapping parts with double-axis hinge element 22 by sliding hinge pin 45 through a bore on upper hinge bracket 50, through bore 47, and then though aligned bore on lower bracket 44 thereby enabling spacer element 20 to rotate in a horizontal arc around double-link hinge element 22. Proximal bracket 32 of the counter balance element 30 has opposing vertical flanges 55 connected by vertical web 56 having an upper surface 57 and lower sure 58. The web 56 is prided with a vertical bore for receiving a hinge pin 45 therethrough. The proximal bracket 32 is detachably coupled to double-axis hinge element 22 at the overlapping parts by sliding hinge pin 45 through the bore on upper hinge bracket 50 opposite the bore connected to spacer element 20, through the bores in the vertical web 56, and then through the aligned bore on lower bracket 44, thereby enabling proximal bracket 32 to rotate in a horizontal arc around double-axis hinge element 22. The bores in the double axis hinge member are separated from each other by a distance sufficient to allow counter balance element 30 to rotate 360° around double-axis hinge element 22 relative to spacer element 20 thereby making it possible to fold the counter balance element 30 flat against either side of spacer element 20 for compact storage as shown in FIG. 4. If the countbalance element and spacer element are of the same lateral thickness, then the centres of the bores should be separated by a distance at least equal to the lateral thickness of one of those elements in order to allow flat-folding in this way.

Figure 5A:
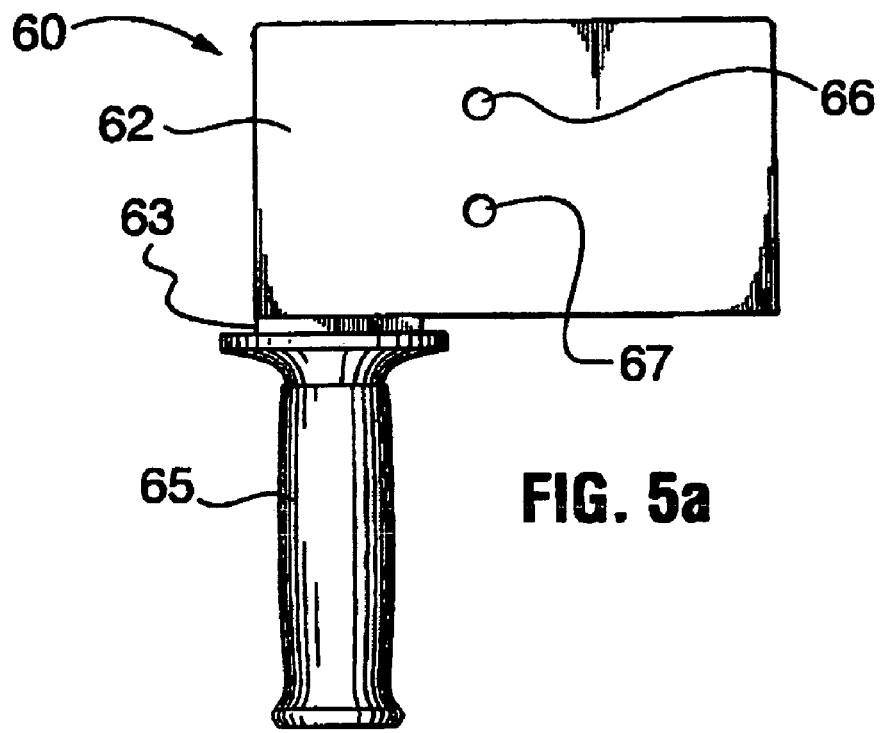
FIGS. 5a and 5b are a side view and bottom view of one component of the portable articulating tool support of the present invention.
Figure 5B:
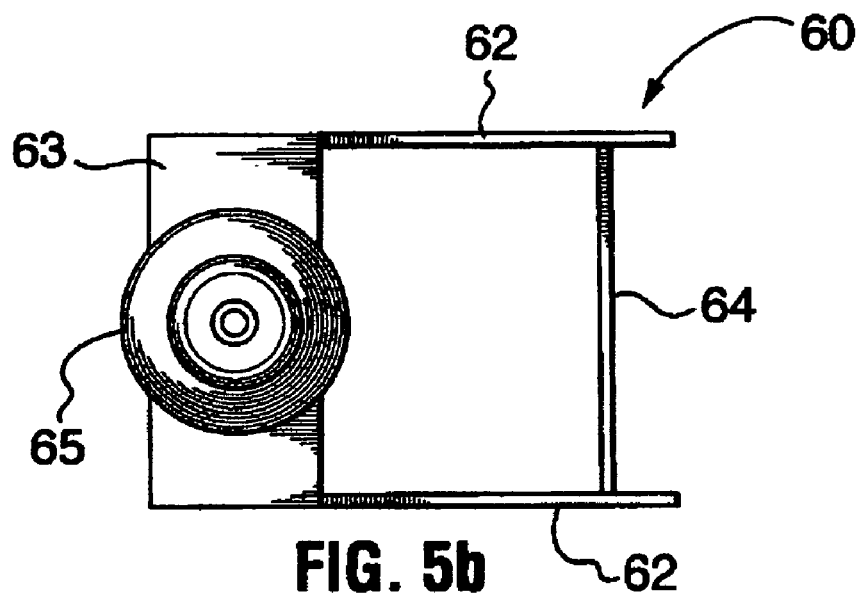
Figure 5C:
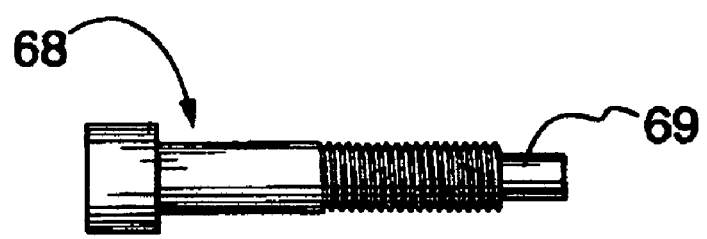
FIG. 5c is a side view of a component which cooperates with the component shown in FIGS. 5a and 5b.

Tool-mounting bracket 60 is exemplified in mom detail in FIGS. 5a, 5b, and 5c. The bracket releasably but firmly engages power tool 61 as shown in FIG. 1. In this embodiment, bracket 60 comprises two opposing flanges 62 conjoined by web 63 with bracket 60 stabilized by spacer rib 64 that is welded to the opposing flanges 62. Web 63 has a bore positioned at its centre for receiving therethrough toolclamping device 65 to firmly secure power tool 61 within bracket 60, e.g. by having a threaded end screwed into a dreaded bore positioned within the power tool body. The clamping device 65 may also act as a handle for manipulation of the power tool via bracket 60. Opposing flanges 62 are provided with at least one pair of aligned bores 66. If so desired, one or more additional pairs of bores (e.g., 67) can be added to opposing flanges 62. Threaded bolts 68 with a terminal pin portion 69 are provided for pivotably communicating with aligned bores 66 or 67, thereby allowing the bracket to swivel around a horizontal axis.

Figure 7:
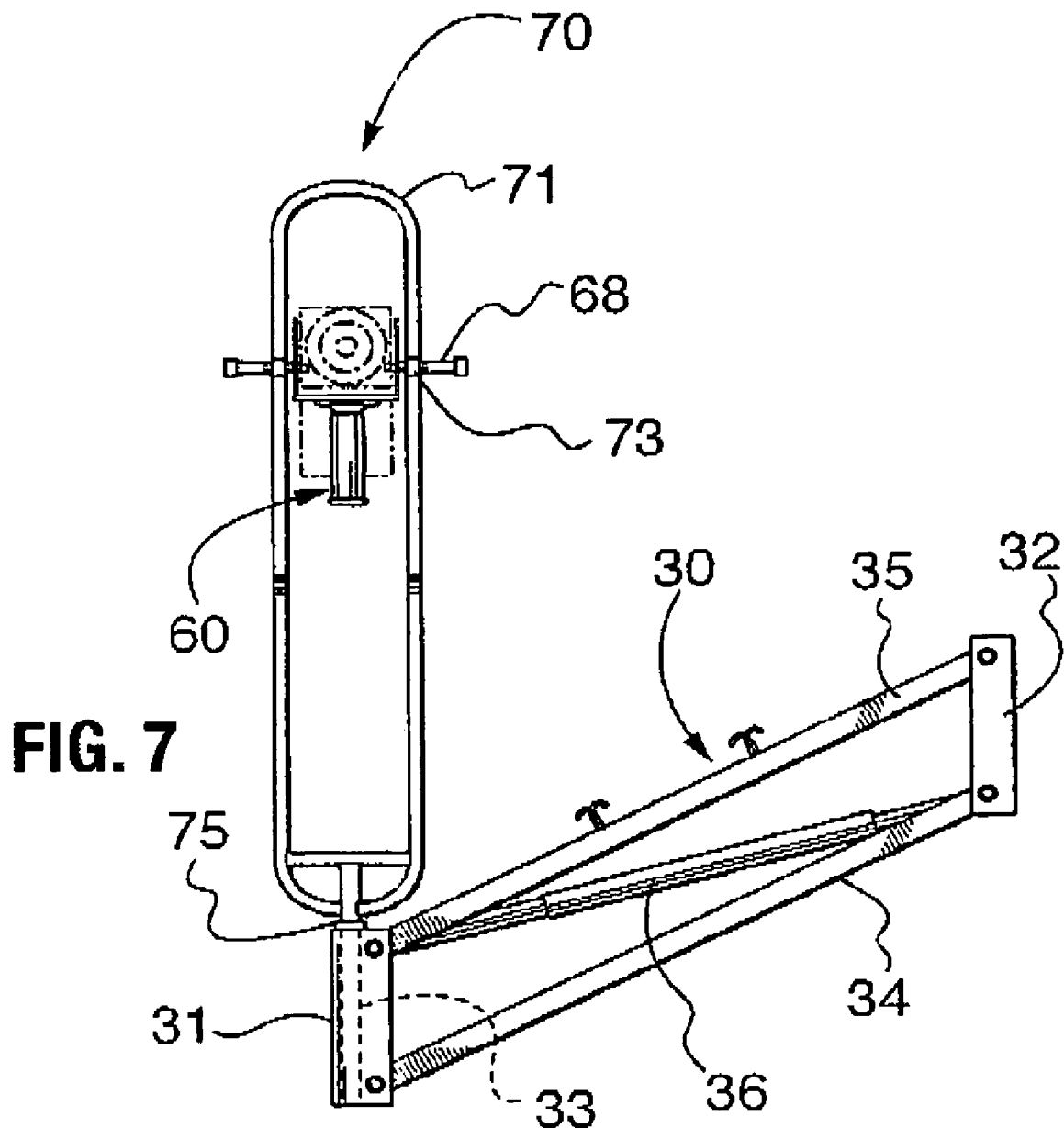
FIG. 7 sows the component of FIG. 6 cooperating with another component at the distal end of the present invention.

Bracket support 70, as exemplified in more detail in FIGS. 6 and 7, has a bracket support 71 in the form of an elongated continuous wire loop integrally connected at one end to load-bearing shaft 72. A pair of opposing sleeves 73 is integrally attached to the loop for slidingly receiving therethrough pin portion 69 of threaded bolt 68, for releasably engaging and pivotably communicating therewith bores 66 or 67 in bracket 60. If so desired, bracket support 70 may be provided with multiple sets of opposing sleeves 73 (two are shown in FIG. 6) to provide a variety of positioning to accommodate power tools of different shapes and dimentions. Load-bearing shaft 72 is adapted to slidingly and rotatingly communicate with shaft receptacle 33 of the distal bracket 31 of the counter-balance element 30 shown in FIG. 1. If so desired, a stop collar 75 can be engaged with load-bearing shaft 72 at a selected point to prevent direct contact between the bracket support 71 and distal bracket 32.

It win be apparent from the figures described above that the various elements of the apparatus together form an articulating arm having a mounting device 15 at one end and a counter-balance element 30, rotatably mounting a tool holder 70, at an opposite end with the spacer element 20 and the double-axis hinge element 22 located therebetween. The various elements of the arm are rotatably attached together at overlapping parts by means of vertically-oriented hinge pins extending through aligned bores in the overlapping parts. The arm can thus be articulated freely in a horizontal plane.

Figure 8:
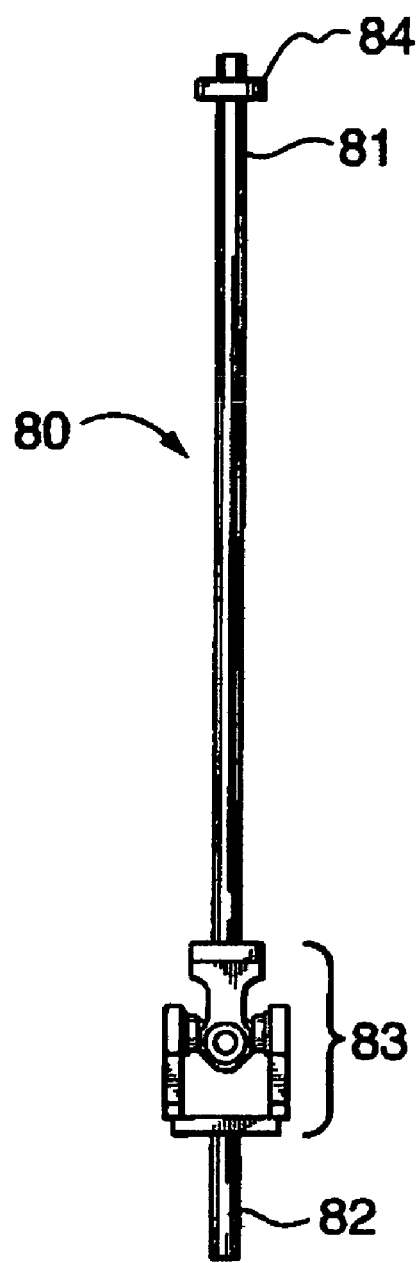
FIG. 8 is a view of an alternative component to the component shown in FIG. 6.
Figure 9:
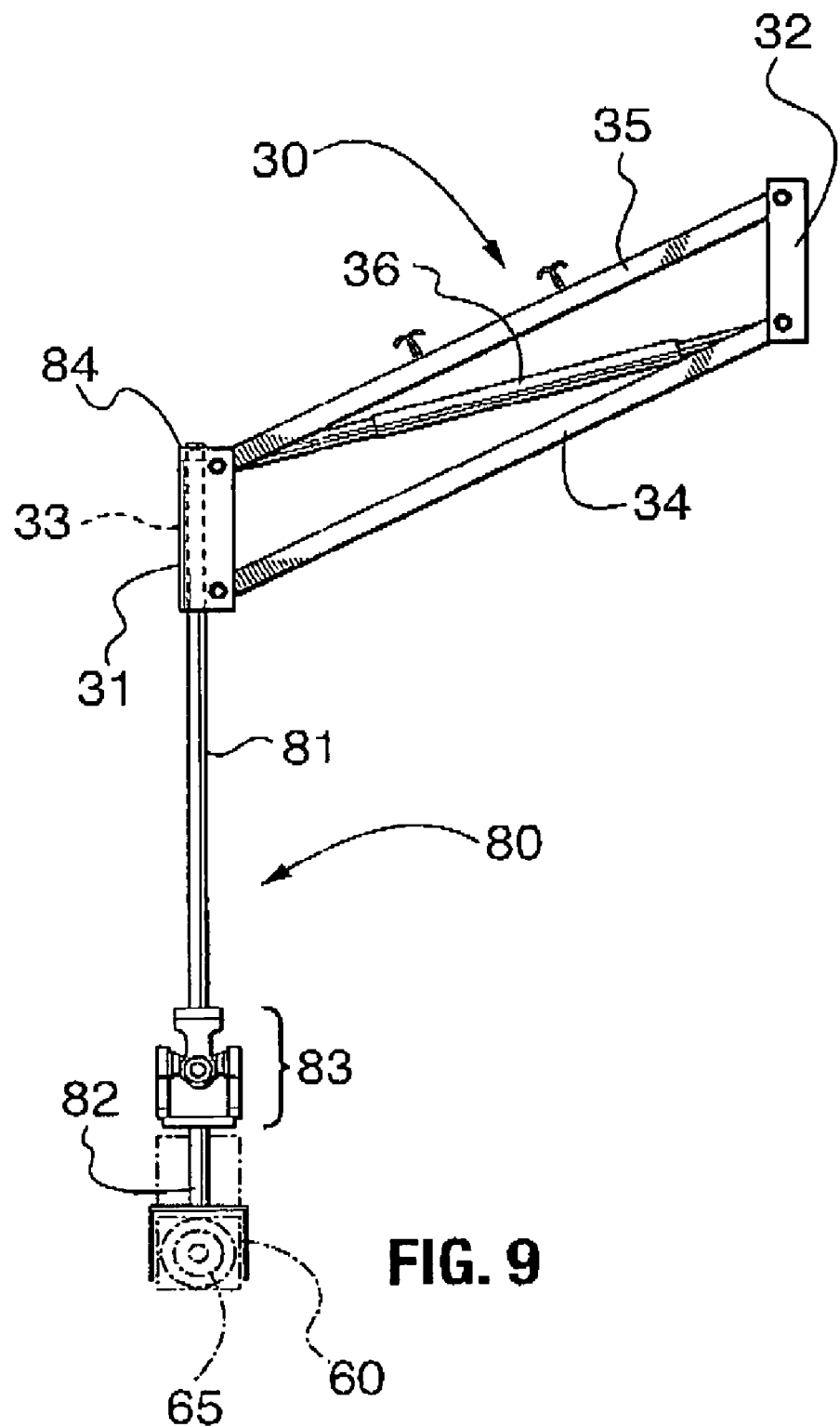
FIG. 9 shows the component of FIG. 8 cooperating with another component at the distal end of the present invention.

It is preferable in some construction, mining and equipment repair applications, to suspend hand-manipulated power tools underneath the portable multi-component articulating support apparatus of the present invention for ease of access to and manoeuvrability around power toolengagement targets. A preferred embodiment of such an is shown in FIGS. 8 and 9. In this embodiment, a bracket support is provided in the form of a tool rod 80 attached at its lower end to tool-clamping device 60, and thus to a power tool 61 (not shown) via a universal joint 83. Tool rod 80 has an upper end 81 adapted to slidingly and rotatably communicate with shaft receptacle 33 of the counter-balance element 30 and a stop collar 84 provided to allow the rod to be suspended from the counter-balance element while allowing for rotation. A lower end 82 of the rod is adapted to engage clamping device 60, and the universal joint 83 is intermediate the first and second ends 81 and 82. End 82 is provided with a threaded bore therein (not shown) for receiving a clamping device of the tool-mounting bracket similar to device 65 of FIGS. 5a and 5b, for pivotably manipulating therefrom power tool 61 (not shown) in multiple planes within a three-dimensional workspace.

Figure 10B:
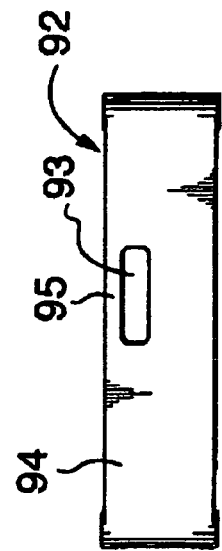
FIGS. 10a and 10b show two embodiments for another component of the portable articulating tool support of the present invention.
Figure 10A:
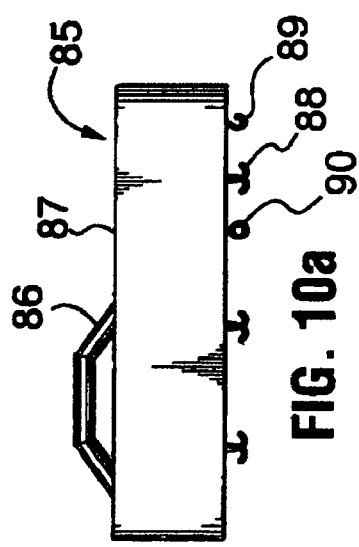

Another preferred bent provides spacer elements having carrying handles to further enhance portability of the articulating tool support of the present invention. FIG. 10a shows a spacer element 85 provided with a carrying handle 86 integrally connected to a top surface 87 of spacer element 85. FIG. 10b shows spacer element 92 having an elongated hole 93 therethrough adjacent spacer arm top surface 94 thereby providing a graspable handle portion 95.

Use of electric and pneumatic-powered hand tools on jobsites typically requires significant lengths of extension cords or pneumatic hoses to supply power to the hand power tools over extended distances. As the operators of such tools move about in three-dimensional workspaces, the distances between the power tools and the source of power vary constantly and considerably resulting in periods of time during which the lengths of extension cords or hoses are folded on themselves and/or are bunched on the floor surfaces whereon the operators are moving about thereby creating worker safety hazards. Yet another preferred embodiment of the present invention provides devices for passing through and retaining power cords and hoses close to the multiple component of the articulating tool support of the present invention as exemplified in FIG. 10a by discontinuous retainer loop 88, retainer hook 89, and continuous retainer loop 90 attached to bottom surface 91 of spacer arm 85. However, it is to be understood that other types of retainers for power cords and hoses known to those skilled in this art arm within the scope of this embodiment of the present invention. Furthermore, while the retainer devices of this embodiment are shown attached to the bottom surface 91 of spacer arm 85, it is also within the scope of this invention to provide the retainer devices on the side surfaces and top surfaces of spacer arms if so desired.

The portable multi-component articulating support apparatus of the present invention can be partially or fully disassembled for transport to a job site, and then quickly assembled on site. This can be achieved by first securing mounting device 15 on a selected support element 5 such as a pole, post, pillar, column, and scaffolding. The support element may be an integral component of the work site or alternatively, portable in the form of an adjustable shoring pole designed to engage the floor and ceiling surfaces of a job site. Alternatively, the present invention may be fixed to a portable structural element having a collapsible framework as exemplified by scaffolding and a tripod. As shown in the preceding figures, the proximal end of spacer element 20 is detachably coupled to mounting device 15 with hinge pin 45, while the distal end of spacer element 20 is detachably coupled to one side of double-axis hinge element 22 with another hinge pin 45. The proximal bracket 31 of counterbalance element 30 is detachably coupled to the other side of double-axis hinge element 22 with another hinge pin 45. Tool-mounting bracket 60 is fitted to a power tool 61 by clamping device 65, after which the bracket is pivotingly engaged with bracket support 70 by pin portions 69 of threaded bolts 68 pivotably communicating with opposing sleeves 73. The load-bearing shaft 72 of tool cage 70 is slidingly engaged with shaft receptacle 33 of the distal bracket 31 of counter-balance element 30.

An operator can easily and with minimal effort manipulate, orientate and operate power tool 61 throughout an ere three-dimensional workspace. This is possible because of vertical movement in a horizontal plane via the distal end of the counter-balance element 30, forward and backward movement permitted by the double-axis hinge element 22 and other rotation around hinge pins 45 that allows concertina-like folding of the support apparatus, as well as swivelling around the mounting device 15 and swivelling around vertical and horizontal axes permitted by the mounting arrangement of the tool-mounting bracket 70. Such manipulation is facilitated by the counter-balancing of the weight of the tool by the counter-balance element 30 (which most preferably includes a gas-charged cylinder 36 having a pressure regulating valve to enable release or addition of compressed air/gas to enable adjustable weight balancing for a variety of power tools having different weights). Power tool 61 may be positioned in a 360° outward oriented horizontal plane by slidingly rotating load-bearing shaft 72 within shaft receptacle 33 of vertical control arm 30, and additionally, can be concurrently pivoted and oriented in a range of approximately 160° to 180° in vertical planes by pin portions 69 of threaded bolts 68 pivotingly communicating with tool cage sleeves 73.

The portable multiple-component support of the present invention can be quickly and easily disassembled by removing tool-mounting bracket 60 engaged with power tool 61, from bracket support 70, then removing bracket support 70 from counterbalance element proximal bracket 32, then removing all hinge pins 45, and finally, clamping device 15 from structural element 5.

It is to be noted that hinge pins 45 (or, in some embodiments, at least one and preferably two or more of them), are provided with enlarged upper ends having T-shaped handles that facilitate grasping and removal of the pins form their respective bores when dis-assembly is required. The en upper ends stand proud of the element that they connect and are therefore readily accessible, but are retained by gravity in the bores. The lower ends of the pins are not enlarged (and may be tapered) so that they do not resist removal from the bores when they are pulled upwardly during dis-assembly.

Figure 11:
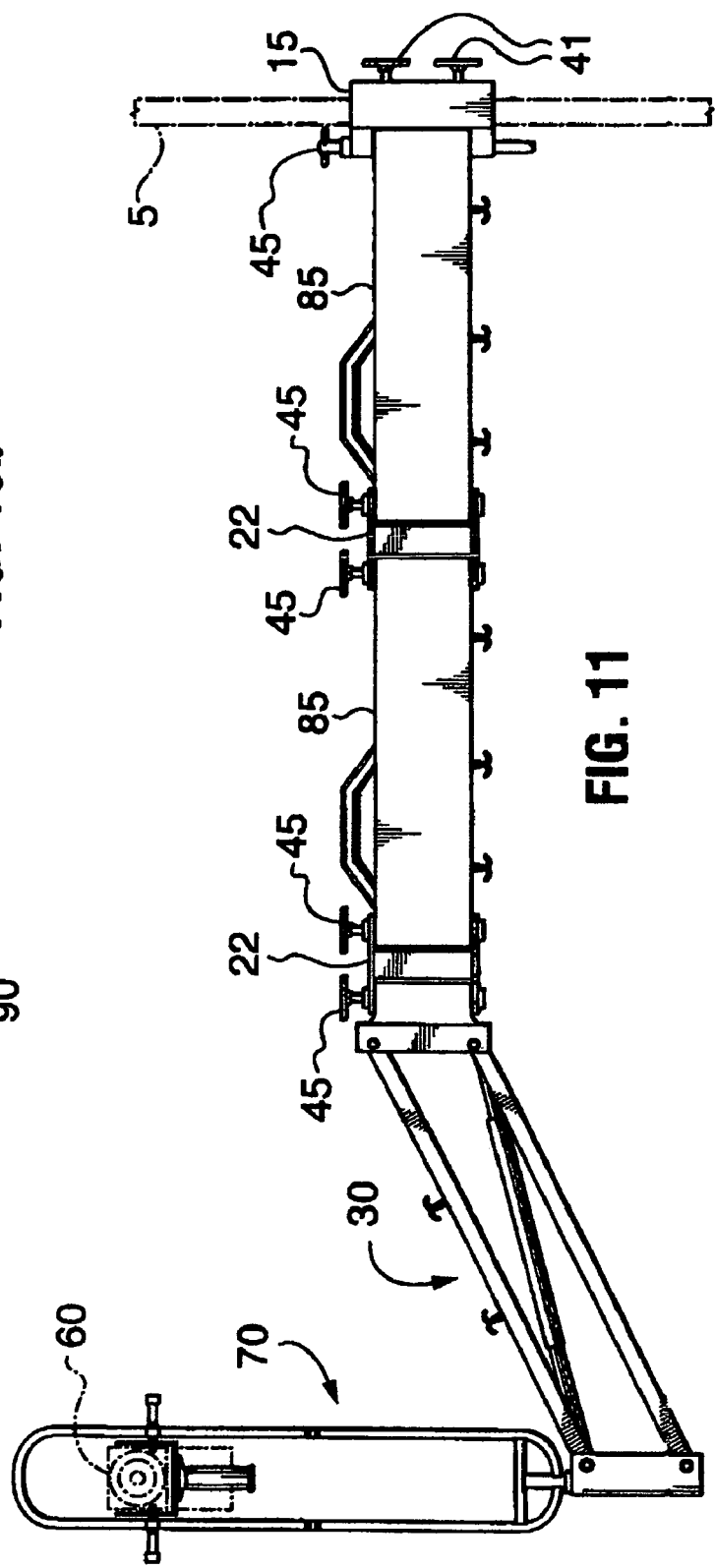
FIG. 11 is a side view of the embodiment of the present invention shown in FIG. 4.

It is to be noted while the foregoing disclosure for the portable multi-component articulating tool support apparatus of the invention illustrates the use of a only one spacer element 20 and only one double-axis hinge element 22, it is also within the scope of the present invention to provide a plurality of such elements arranged in an alternating fashion between the counter-balance element and the mounting device, to increase the maximum length of the apparatus when desired. Such an arrangement having two spacer elements and two double-axis hinge elements is exemplified in FIG. 11.

While this invention has been described with respect to the preferred embodiment it is to be understood that various alterations and modifications can be made to components of the portable articulating tool support within the scope of this invention, which are limited only by the scope of the appended claims.

The invention claimed is:

1. A portable articulating support apparatus for supporting a hand-manipulated power tool while allowing movement of the tool in three dimensions, the apparatus comprising:
   a tool holder capable of engaging and supporting a hand-operated power tool while allowing swivelling of said tool about horizontal and vertical axes, the tool holder having one end provided with a vertical load-bearing shaft configured for engaging and cooperating with a receptacle wherein the tool holder comprises a tool-mounting bracket equipped with a tool-clamping device, the bracket being pivotally attached to a bracket support that allows the bracket to swivel around a horizontal axis, the bracket support having the vertical load-bearing shaft pivotally held by the receptacle of said counterbalance element while permitting swivelling of said tool holder about a vertical axis;
   a counterbalance element having opposite ends, with one end detachably engagable with a double-axis hinge member and an opposite end provided with a receptacle configured for engaging and cooperating with the vertical load-bearing shaft, said opposite end being movable in a vertical plane while said one end is supported by said one hinge member, and having a balancing arrangement generating a force counteracting weight applied to said one end by said tool holder,
   at least one spacer element having opposite ends, wherein each end is detachably engagable with a double-axis hinge member;

at least one double-axis hinge member having two opposed spaced-apart parallel bores therethrough for receiving hinge pins therein; and a mounting device for the apparatus capable of disengageable attachment to a support element, the mounting device configured to detachably and hingeably engage one end of the spacer element;

wherein said counterbalance element, said at least one double-axis hinge member, said at least one spacer element, and said mounting device are arranged to form interconnecting parts of an articulating arm having said mounting device at one end of the articulating arm, said counterbalance element at an opposite end of the articulating arm, said at least one spacer element detachably and hingeably engaged with said mounting device, said at least one double-axis hinge member interposed said spacer element and said counterbalance element and detachably engaged therewith; and a plurality of vertically disposed hinge pins passing through vertically aligned bores, including said spaced, parallel bores of said at least one double-axis hinge member, in said interconnecting parts of said articulating arm to allow pivotal rotation of said parts around said hinge pins, at least one of said hinge pins being slidably removable from one said bores and having an enlarged head at an upper end thereof shaped to be graspable by hand to facilitate complete removal of said pin, thereby allowing at least partial disassembly of said articulating arm for ease of transportation of said apparatus.

2. The apparatus of claim 1 having a plurality of spacer elements and a matching plurality of double-axis hinge members.

3. The apparatus of claim 1 wherein all of said hinge pins are slidably removable from said bores and all have enlarged heads at upper ends thereof shaped to be graspable by hand to facilitate complete removal of said pins from said bores.

4. The apparatus of claim 1 wherein said bracket support comprises a frame rigidly attached at a lower end to said vertical load-bearing shaft and extending upwardly from said counterbalance element.

5. The apparatus of claim 4 wherein the frame comprises an elongated continuous loop encircling said tool-mounting bracket integrally connected at one end to the vertical load-bearing shaft the continuous loop having a pair of opposed sleeves for receiving a pair of bolts pivotally supporting the tool-mounting bracket.

6. The apparatus of claim 5 wherein the frame is provided with a plurality of integral pairs of said opposed sleeves but only one pair of bolts, the bolts being selectively positionable in any one pair of sleeves.

7. The apparatus of claim 1 wherein the bracket support extends downwardly from said counterbalance element and includes a universal joint interconnecting said tool-mounting bracket to said vertical load-bearing shaft.

8. The apparatus of claim 1 wherein the tool-mounting bracket comprises opposing plates integrally connected to a bottom plate, the bottom plate having a bore receiving a part of said tool-clamping device for securing a power tool.

9. The apparatus of any of claim 8 wherein the opposing plates are provided with a pair of aligned opposing bores pivotally receiving supporting bolts attached to said bracket support.

10. The apparatus of claim 9 wherein the opposing plates are provided with a plurality of said aligned opposed bores.

11. The apparatus of claim 1 wherein said at least one double-axis hinge member comprises an upper elongate plate integrally connected by a web to a lower elongate plate, and wherein said spaced, parallel bores pass through the upper and lower elongate plates on either side of the web.

12. The apparatus of claim 1 wherein said counterbalancing arrangement of said counterbalance arm comprises a gas-charged cylinder.

13. The apparatus of claim 12 wherein the gas-charged cylinder is provided with a valve for facilitating adjustment of gas pressure therein.

14. A portable articulating support apparatus for supporting a hand-operated power tool while allowing movement of the tool in three dimensions, the apparatus comprising:

a tool holder capable of engaging and supporting a hand-operated power tool while allowing swivelling of said tool about horizontal and vertical axes, the tool holder having one end provided with a load-bearing shaft configured for engaging and cooperating with a receptacle wherein the tool holder comprises a tool-mounting bracket equipped with a tool-clamping device, the bracket being pivotally attached to a bracket support that allows the bracket to swivel around a horizontal axis, the bracket support having the vertical load-bearing shaft pivotally held by the receptacle of said counterbalance element while permitting swivelling of said tool holder about a vertical axis;

a counterbalance arm having opposite ends, with one end detachably engagable with a double-axis hinge member and an opposite end provided with a receptacle configured for engaging and cooperating with the load-bearing shaft, said opposite end being movable in a vertical plane while said one end is supported by said one hinge member, and having a balancing arrangement generating a force counteracting weight applied to said one end by said tool holder;

at least one spacer element having opposite ends, wherein each end is detachably engagable with a double-axis hinge member;

a double-axis hinge member having two juxtaposed bores for receiving hinge pins therethrough;

a mounting device capable of disengageable attachment to a support element;

wherein said counterbalance element, said at least one double-axis hinge member, said at least one spacer element, and said mounting device, are detachably and rotatably engaged one with another by a plurality of removable vertically disposed hinge pins passing through vertically aligned bores in overlapping parts of said counterbalance element, said at least one double-axis hinge member, said at least one spacer element, and said mounting device, said removable hinge pins having enlarged heads at upper ends thereof shaped to be graspable by hand to facilitate complete removal of the pins from said bores, thereby allowing separation of said counterbalance element, said at least one double-axis hinge member, said at least one spacer element, and said mounting device for ease of replacement, storage and transport thereof.

* * * * *